R. S. TOWNE AND F. B. FLINN.
APPARATUS FOR SEPARATING ORE MATERIALS FROM EACH OTHER.
APPLICATION FILED SEPT. 12, 1914.
1,410,781.
Patented Mar. 28, 1922.
3 SHEETS—SHEET 1.
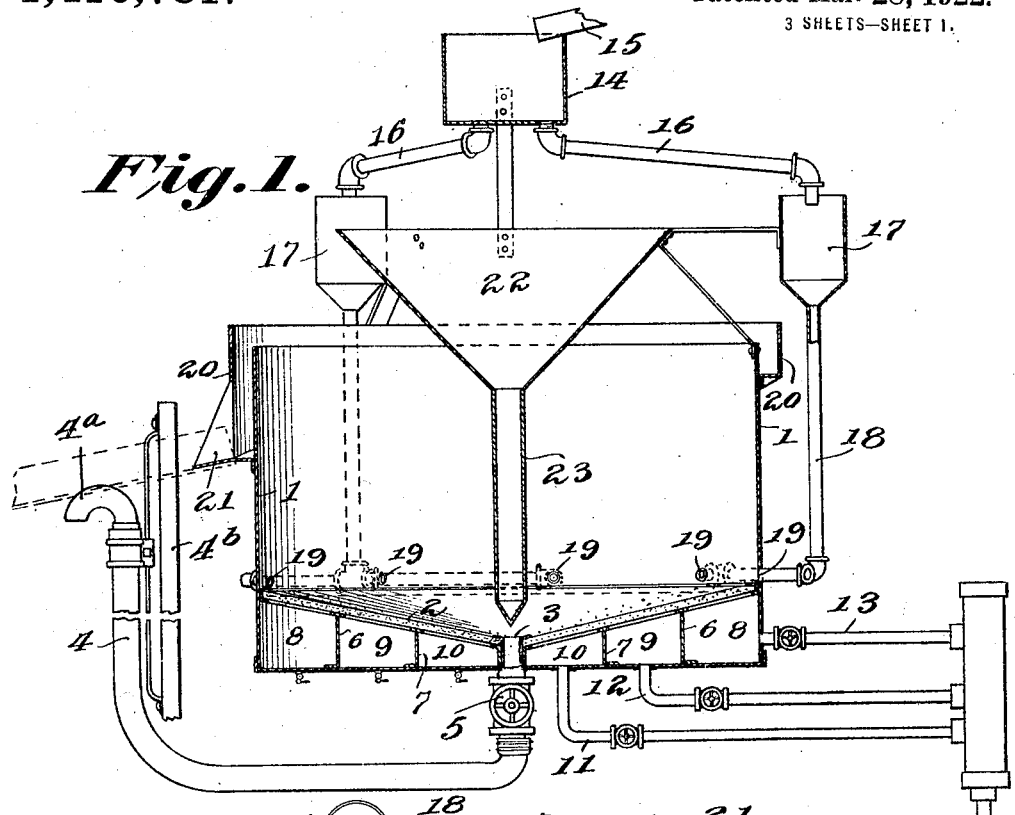
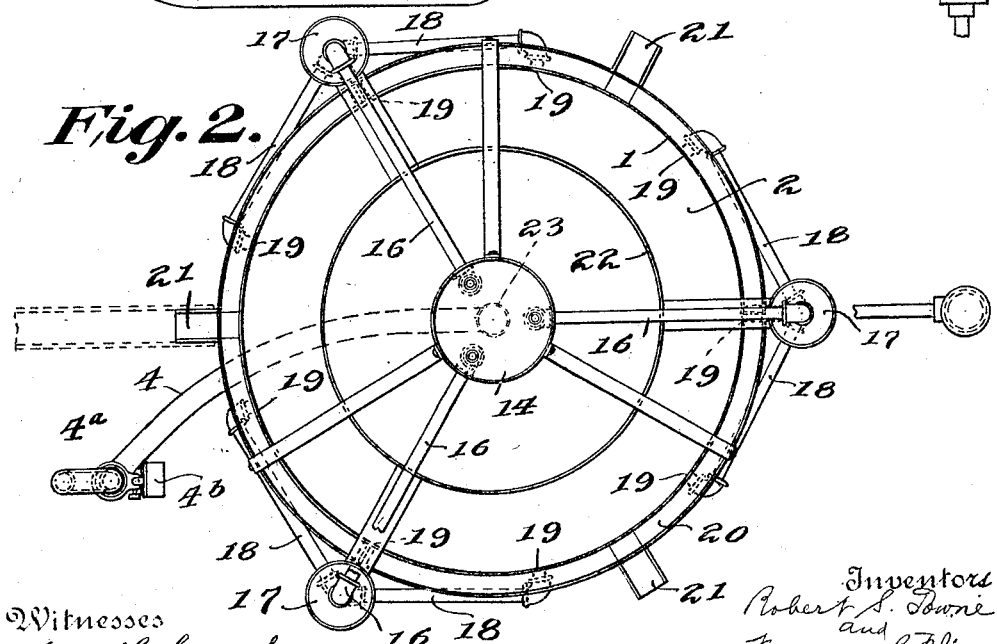

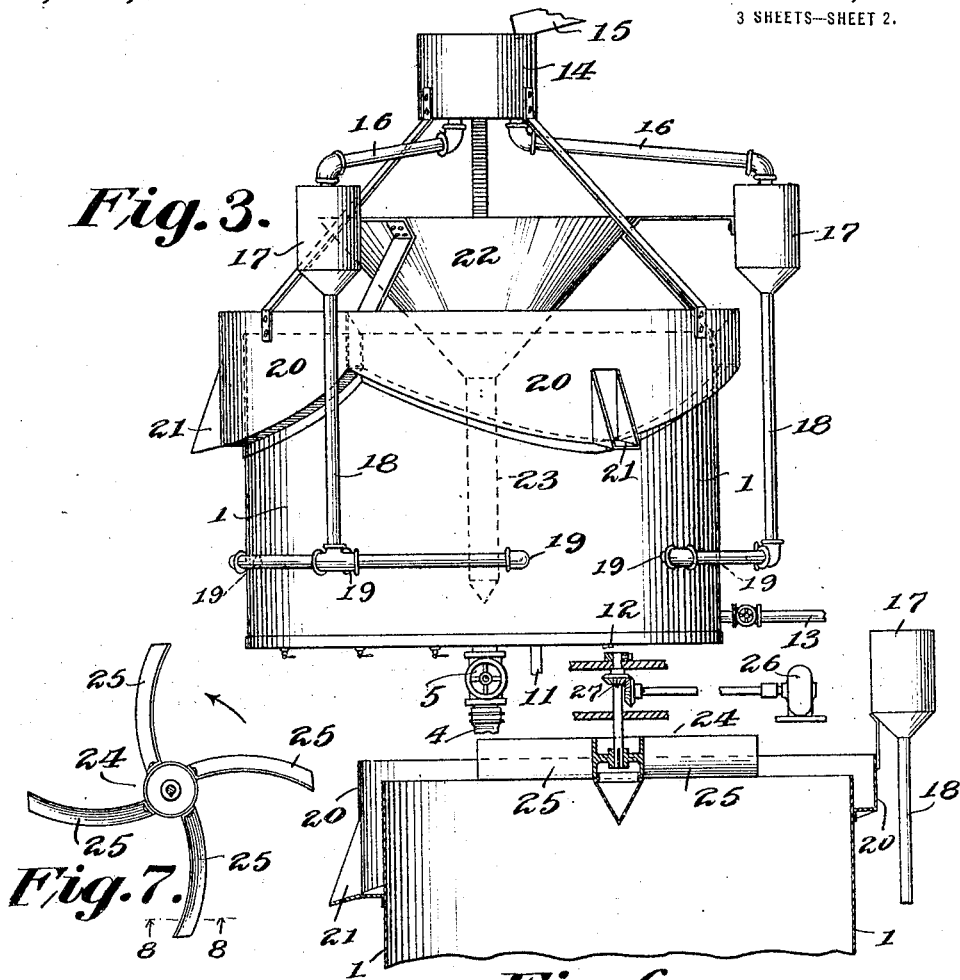

R. S. TOWNE AND F. B. FLINN.
APPARATUS FOR SEPARATING ORE MATERIALS FROM EACH OTHER.
APPLICATION FILED SEPT. 12, 1914.
1,410,781.
Patented Mar. 28, 1922.
3 SHEETS—SHEET 3.
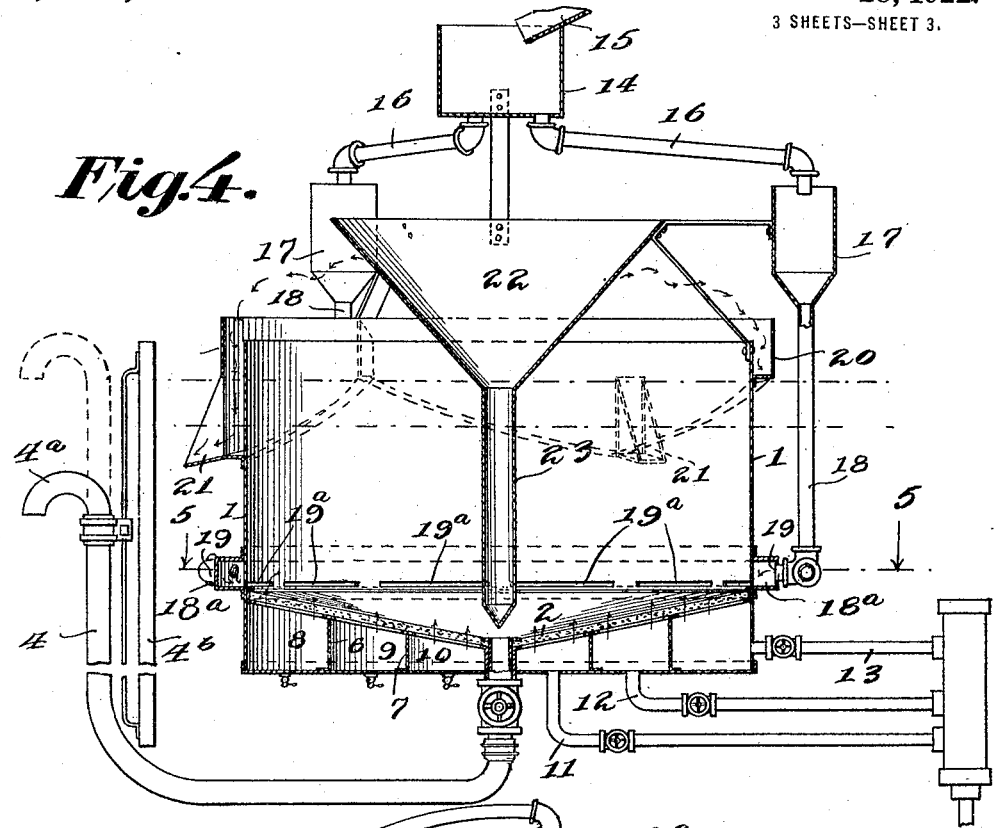
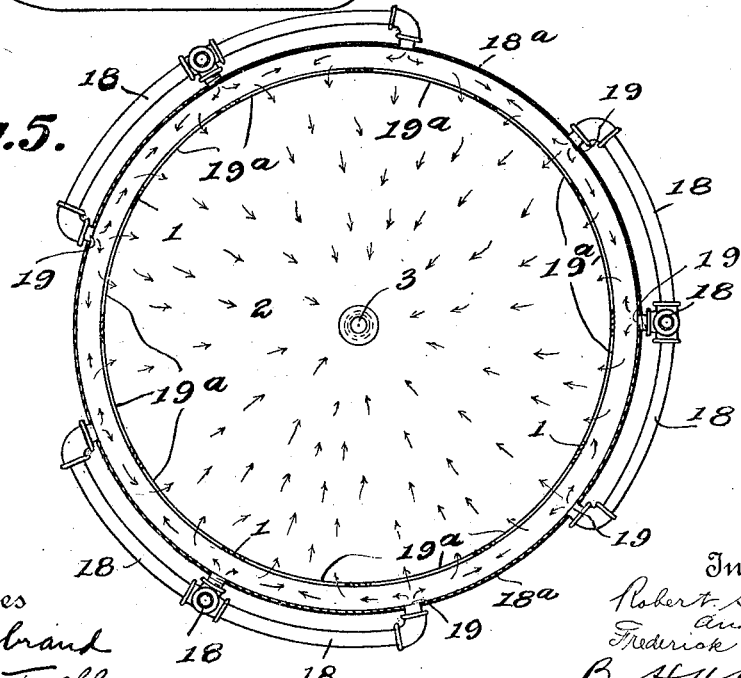

UNITED STATES PATENT OFFICE.

ROBERT SAFFORD TOWNE, OF NEW YORK, N. Y., AND FREDERICK B. FLINN, OF ORANGE, NEW JERSEY, ASSIGNORS, BY MESNE ASSIGNMENTS, TO PNEUMATIC PROCESS FLOTATION COMPANY, OF NEW YORK, N. Y., A CORPORATION OF DELAWARE.

APPARATUS FOR SEPARATING ORE MATERIALS FROM EACH OTHER.

1,410,781.          Specification of Letters Patent.     Patented Mar. 28, 1922.

Application filed September 12, 1914. Serial No. 861,432.

*To all whom it may concern:*

Be it known that we, ROBERT S. TOWNE and FREDERICK B. FLINN, citizens of the United States, residing at New York and Orange, in the counties of New York and Essex and States of New York and New Jersey, have invented certain new and useful Improvements in Apparatus for Separating Ore Materials from Each other, of which the following is a specification, reference being had therein to the accompanying drawing.

This invention relates to an apparatus for treating ores for the purpose of separating the metalliferous particles from the non-metalliferous particles thereof.

In the practice of the invention a pulp is formed by commingling the ore in its original condition with water in suitable proportions, and, generally, there is added, at one stage or another, a quantum of oil or equivalent material for purposes now well known. A column of pulp is formed and the air is forced into the bottom part of this column, generally through a porous septum or diaphragm adapted, under proper conditions of depth of column, pressure of air and degree of permeability of the septum, to form the relatively large bubbles referred to. The pulp is delivered as a continuous supply to the column.

In the case of some ores we have found that it is more advantageous to deliver the incoming pulp at horizontal planes which are high relatively to the planes of the porous septum, and in such cases the column may be of relatively lesser horizontal dimensions. But in respect to other ores we have found that the pulp can be more advantageously delivered in such way that it will be initially carried over a greater horizontal area while it is moving downward. And, generally, in such cases, it is better to feed the pulp mass to the column in horizontal plane relatively near to the porous septum, the latter being horizontally extended so that each of the metalliferous particles will be exposed to numerous columns of up-rising bubbles. And where the column is thus extended horizontally it is advantageous to deliver the incoming pulp from supply devices which are remote from the axis of the column, and in such way as to effect a uniform distribution of the solid contents of the pulp over the horizontal area of the outer or peripheral parts of the column, as well as over the area at and adjacent to that axis, in contradistinction from a supply which is delivered along the axis and is finally deflected from the axis outward. As the column increases the dimensions of its cross horizontal area there is increased resistance to the outward projection of the incoming pulp unless it is delivered under high pressure, which is not available under ordinary circumstances, and if used results disadvantageously in the forming of eddies or whirls of the water which interfere with the action of the air. At present we prefer to supply the incoming pulp by delivery devices which direct it radially inward from points outside of the column as an entirety.

Of the drawings,

Fig. 1 is a vertical sectional view showing one form of mechanism embodying the invention;

Fig. 2 is a plan view of the mechanism shown in Fig. 1;

Fig. 3 is a side elevation of the mechanism shown in Fig. 1;

Fig. 4 is a fragmentary sectional view similar to Fig. 1 and showing a modified form of mechanism;

Fig. 5 is a sectional view taken along the line 5—5 of Fig. 4;

Fig. 6 is a fragmentary sectional view similar to Fig. 1, but showing a modified form of mechanism;

Fig. 7 is a detail plan view of the rotary distributor shown in Fig. 6;

Fig. 8 is a detail sectional view along the line 8—8 of Fig. 7; and

Fig. 9 is another fragmentary sectional view also similar to Fig. 1, but showing another modified form of mechanism.

Referring to the drawings, 1 represents the main tank or receptacle which is preferably, though not necessarily, cylindrical in form. It may conveniently be constructed of sheet metal, though any other suitable material may be used when preferred.

The tank is provided with a supplemental bottom or septum 2 which is formed of some suitable porous medium, such as silica sponge, carborundum, a plurality of perforated metal plates, sheets of canvas, etc. The porous bottom 2 is inclined radially to cause the flow by gravity of material along it and, in the embodiment shown, the inclination is from the periphery inward, thus giving the bottom a conical shape. At the center the porous bottom is provided with an opening 3, which communicates with a pipe 4 controlled by valve 5. The pipe 4 is preferably a flexible hose and is provided at its end with a goose neck nozzle 4ª. The nozzle may be supported on an adjustable standard such as that at 4ᵇ so that it can be moved to different elevations for a purpose to be hereinafter made clear.

Preferably the space beneath the porous bottom 2 is divided by cylindrical partitions such as 6 and 7 into annular spaces 8, 9 and 10. With the spaces there are connected respectively valved pipes 11, 12 and 13 which communicate with a suitable source of air supply.

14 represents a suitable initial receiver for the ore pulp. This can be located at any convenient place, and in the drawings it is shown as positioned directly above the main receptacle 1. The pulp is introduced into the receiver 14 in any suitable way, as, for instance, through the trough 15. From the receiver 14 the pulp passes through pipes 16, 16 to secondary receivers 17, 17 arranged around the outside of the tank 1. In the drawings we have shown three of these secondary distributing receivers, but it will be understood that the number may be varied as found necessary or convenient. Each of the secondary receivers 17 has connected with it a plurality of (in this case three) supply pipes 18, 18 which are connected with the main receptacle 1 through suitable apertures 19, 19 just above the porous bottom 2. These apertures are preferably spaced uniformly around the periphery.

It will be understood that the supply of pulp to the receptacle need not necessarily be through circular apertures such as those at 19, 19. In fact, it is in many cases preferably to provide circumferentially elongated slots through which the ore pulp can be delivered in the form of thin horizontal sheets. In Figure 4 we have shown a modified form of mechanism having supply slots 19ª, 19ª which communicate with a supply box 18ª which extends entirely around the receptacle. The pulp can be led to the box 18ª in any suitable way, as, for instance, through pipes 18, 18 corresponding to the supply pipes shown in Figures 1, 2 and 3. The ore enters through the slots 19ª in broad streams and the inflow of ore takes place around the inner circumference, except at the short places between the slots. By means of this construction we obtain a somewhat more uniform distribution of the ore over the cross area of the pulp body than is possible with the construction shown in Figures 1 to 3.

Located around the outside of the upper part of the main receptacle 1 is an annular bubble receiver 20. It is made in sections, preferably three in number, the bottom of each section being inclined toward a discharge spout 21.

As the tank 1 may be of large diameter, we find it advisable to provide means for assisting the discharge of the bubbles from the central parts thereof. In the form of mechanism shown in Figures 1 to 3 there is provided a conical bubble distributor 22, the lower inclined surface of which engages the bubbles and forces them outward toward the periphery. Preferably there is also provided a tube 23 closed at its lower end which extends downward from the bottom of the cone 22 and occupies the space immediately above the discharge opening 3, at which, of course, no bubbles are introduced.

In Figures 6 to 8 we have shown another device for assisting the removal of the central bubbles. In this construction the cone 22 is omitted, and instead there is provided a rotary bubble distributor or spreader 24 having radial blades 25, 25 adapted to engage the bubbles and push them outward. The distributor can be driven in any suitable way, as, for instance, by the motor 26 through the gearing 27.

In Figure 9 another device is shown to assist in removing the bubbles from the central parts of the receptacle. It comprises a supplemental central bubble receiver 28 which connects with the main receiver by means of the inclined pipe 29.

In using the apparatus, the ore, after being first pulverized (when pulverization is necessary) is formed into a suitable liquid pulp of which oil, when necessary, may be a constituent. This pulp is introduced in a stream into the initial receiver 14, from which it flows through the pipes 16, 16 into the secondary distributors 17, 17; and from these secondary distributors it flows through the pipes 18, 18 and the apertures 19, 19 or 19ª, 19ª into the receptacle 1 at the periphery thereof and close to the porous septum 2.

We have heretofore proposed, in work of this character, to feed the ore pulp into the receptacle along radial lines from a single central distributing or spraying device, and this method of feeding has been satisfactory for small receptacles. But when larger receptacles are used so that the horizontal cross areas are wide, it is difficult, especially with the low head ordinarily available, to project the pulp from a single distributor with such force as to reach all parts of the receptacle and effect an approximately uniform distribution. It is undesirable to attempt to effect the uniformity of distribution by increasing the head as this involves expense in installing pumps or long pipe lines, and the high head, even if readily available, would be objectionable because of the cross currents and eddies which would result from the too rapid injection of the pulp into the main body. We, therefore, provide means remote from the center whereby the ore pulp can be introduced at a number of points and horizontally distributed under low pressure. Preferably the introduction of the ore takes place at the periphery of the receptacle and the ore is directed inward toward the center. When the ore is introduced through long slots, such as those at 19ª, 19ª, the pulp assumes the form of a sheet extending over substantially the entire cross area. It will be understood that while the peripheral location of the pulp supplying devices is preferred, our invention is not so limited and other suitable locations can be used. And it will be furthermore understood that we do not mean to exclude the use in combination with the non-central feeding devices of other devices located at or near the center for supplying pulp to the central parts of the receptacle.

Through the pipes 11, 12 and 13 air is introduced into the chambers 8, 9 and 10, beneath the porous bottom 2, and from these chambers the air passes through the porous bottom and into the pulp in the receptacle in the form of relatively large bubbles which are substantially uniformly distributed. The pulp introduced through the openings at 19, 19 tends to flow radially downward and inward under the action of gravity. The ore, as it moves inward, is engaged by the upwardly moving air bubbles and the metalliferous particles thereof are caught by the bubbles and carried upward. The ore, as it passes inward, is repeatedly acted upon by the bubbles, with the result that when the center is reached all of the metalliferous particles have been caught by the bubbles and removed. The gangue passes outward through the opening at 3.

According to earlier processes and mechanisms devised by us, the ore pulp is introduced at points considerably above the bottom plate or septum and is permitted to move downward by gravity in direct opposition to the upwardly moving bubbles. We find, however, that for certain classes of work, especially when the receptacle is very large, it is preferable to feed the ore in such a way that it moves at approximately right angles to the upwardly moving bubbles instead of vertically in the opposite direction. According to the earlier processes, the contact of each ore bubble with a number of bubbles was insured by its movement downward through a relatively deep pulp body and past a large number of upwardly moving bubbles. With the process herein disclosed the contact of each ore particle with a number of bubbles is insured by causing it to pass across a large number of bubble paths.

The air pressures in the chambers 8, 9 and 10 may be varied relatively to each other in order to regulate and control the flow of air into the receptacle. In practice it is advisable, in using a machine of this character, to vary the action of the air as the pulp moves radially, one rate of air supply being most efficient near the periphery where the pulp is rich and its flow is slow, and another rate of air supply being most efficient near the center where the pulp is nearly barren and its flow is more rapid.

The level of the liquid in the tank 1 may be regulated and controlled by means of the valve 5, or by means of the pipe 4, the outer discharge end of which may be raised or lowered as found necessary.

The bubbles carrying the metalliferous particles in their films continue to move upward above the top surface of the pulp and the successively emerging bubbles are carried upward by those that follow, with the result that there is formed a bubble column extending to the top of the receptacle wall. At the top of the wall the bubbles move radially outward under the influence of gravity and are discharged into the annular receiver 20. In this receiver many of the bubbles break up, but those which remain, and the liquid resulting from those which have burst, flow by gravity down the inclined bottom of the annular receiver and out through the spouts 21. As the receiver 20 is formed in sections, each with its own discharge spout, it can be relatively small.

In order to assist in the removal of the central bubbles special devices may be provided. One such device is a distributor cone 22 as shown in Figures 1, 2 and 3, and another is a rotating spreader 24 shown in Figure 6. Another device for handling the central bubbles is the supplemental receiver shown in Figure 9.

We do not herein specifically claim the rotating bubble distributor or spreader shown in Figure 6, as that is shown and claimed in our co-pending application Serial No. 861,433, filed on even date herewith.

What we claim is:

1. A frothing classifier comprising a tank having an overflow for froth, a downwardly converging permeable bottom, and means for delivering gaseous fluid to the tank through the converging permeable bottom.

2. A frothing classifier comprising a tank having an overflow for froth, a downwardly converging permeable bottom, and means for delivering gaseous fluid to the tank through the converging bottom, said tank having a gangue outlet medially of said permeable bottom.

3. In an apparatus for separating the metalliferous from the non-metalliferous ingredients of an ore mass, the combination of a pulp receptacle, a porous bottom for the receptacle inclined downward along lines extending from the periphery thereof, means for supplying air under pressure below the said porous bottom and forcing it therethrough to form relatively large substantially uniformly distributed air bubbles, an initial receiver for the pulp, a plurality of secondary receivers for the pulp, means for leading the pulp from the initial to the secondary receivers, a plurality of pipes for leading the pulp from each of the secondary receivers to the main receptacle at points spaced along the periphery of the latter, the said pulp flowing downward and inward over the said bottom in the directions of inclination and being acted upon by the said bubbles to remove the metalliferous ingredients therefrom, and means at the center of the bottom for collecting and discharging the resulting barren pulp from the receptacle at the center of the bottom.

4. In an apparatus for separating the metalliferous from the non-metalliferous ingredients of an ore mass in finely reduced or pulverulent condition, the combination of a pulp receptacle, a porous bottom for the receptacle inclined downwardly along lines extending from the periphery to the center thereof and formed of material having finely reduced air passages adapted to permit the upward passage of air but to arrest water and the finest particles of pulverulent ore, means for supplying air under pressure below the said porous bottom and forcing it therethrough to form relatively large substantially uniformly distributed air bubbles in strata rapidly succeeding each other, each extending over the entire horizontal cross area of the pulp mass, said bottom being adapted to have the entering air dislodge the fine particles of ore arrested thereby, means for supplying ore pulp to the receptacle, the said pulp being acted upon by the said bubbles after they leave the surface of the bottom to remove the metalliferous ingredients from the fluid pulp, and means at the center of the bottom for collecting and discharging the resulting barren pulp, said means being arranged substantially as set forth to cause the down-flowing water to remove from the inclined bottom the arrested pulp.

In testimony whereof, we affix our signatures, in presence of two witnesses.

ROBERT SAFFORD TOWNE.
FREDERICK B. FLINN.

Witnesses:
DAVID SCOTT,
R. E. SAFFORD.